United States Patent [19]

Keene et al.

[11] Patent Number: 4,872,960

[45] Date of Patent: Oct. 10, 1989

[54] PROTECTIVE COATINGS OF A CURED HYDROXYSTYRENE MANNICH BASE AND BLOCKED POLYISOCYANTES

[75] Inventors: Donna L. Keene, Carrollton, Va.; Darrell D. Hicks, Jeffersontown, Ky.

[73] Assignee: Hoechst Celanese Corporation, Somerville, N.J.

[21] Appl. No.: 219,695

[22] Filed: Jul. 18, 1988

[51] Int. Cl.$^4$ .............................................. C08L 29/00
[52] U.S. Cl. .................. 204/181.7; 524/376; 524/379; 524/389; 524/543; 525/124
[58] Field of Search ............... 524/507, 543, 376, 379, 524/389; 525/124

[56] References Cited

U.S. PATENT DOCUMENTS

| | | | |
|---|---|---|---|
| 4,341,681 | 7/1982 | Sekmakas | 524/535 |
| 4,376,000 | 3/1983 | Lindert . | |
| 4,387,197 | 6/1983 | Sekmakas | 523/414 |
| 4,396,732 | 8/1983 | Sekmakas | 523/414 |
| 4,399,257 | 8/1983 | Kitsuda et al. . | |
| 4,433,015 | 2/1984 | Lindert | 524/543 |
| 4,442,246 | 4/1984 | Brown et al. . | |
| 4,457,790 | 7/1984 | Lindert | 524/413 |
| 4,517,028 | 5/1985 | Lindert | 524/543 |
| 4,737,529 | 4/1988 | Sekmakas | 523/411 |

Primary Examiner—C. Warren Ivy
Attorney, Agent, or Firm—Richard S. Roberts; Donald R. Cassady

[57] ABSTRACT

A coating composition which is a uniformly dispersed admixture of
A. a fluid carrier; and
B. a homopolymer or copolymer containing monomer units of the formula

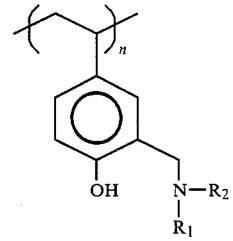

wherein $R_1$ and $R_2$ are preferably hydroxyalkyl and the polymer has a preferred average molecular weight in the range of from about 5,000 to about 30,000; and
C. a blocked polyisocyanate.

21 Claims, No Drawings

PROTECTIVE COATINGS OF A CURED HYDROXYSTYRENE MANNICH BASE AND BLOCKED POLYISOCYANTES

BACKGROUND OF THE INVENTION

The present invention relates to the art of surface protection treatments, more specifically, it relates to water borne protective coatings obtained from a cured admixture of a Mannich base of a hydroxystyrene homopolymer or copolymer and a blocked isocyanate.

The desire for applying protective coatings to metal and other surfaces for the purpose of enhancing resistance to corrosion is well known in the art. Indeed, a plethora of coating compositions directed to this end are well documented in the published literature and many are commercially available as well. Typical protective coatings may include pigments suspended in a vehicle. The vehicle consists primarily of a resinous binder dissolved in solvents or dispersed in water together with small quantities of driers, plasticizers, and stabilizers as required by the intended end use. As the film dries the vehicle changes from a liquid to a solid film either by evaporation of water or solvents, oxidation or polymerization through the application of heat, acceleration by a catalyst or a combination of reactive components. To this end protective coatings include oleoresinous paints or drying oils; oil based paints; alkyd, phenolic, epoxy, chlorinated rubber silicone, vinyl, acrylic, nitrocellulose, polyester and poly-urethane paints and varnishes. The selection of coating depends on its intended application and the degree of protection required for the ambient conditions.

Polyurethane coatings ar formed through the reaction of a polyisocyanate with a substance containing reactive hydrogen such as a hydroxyl bearing polyester or polyether. Polyurethane coatings include formulations which are one-package moisture-cured, two-component polyol-cured and oil modified.

In two-component polyol-cured formulations, the polyisocyanate fraction usually is partially prepolymerized with a portion of the polyol; otherwise the very short cure time after mixing would make this coating very difficult to apply.

The polyol fraction, usually consisting of various hydroxyl bearing polyesters, polyethers, or blends of these and contains the pigment for pigmented coatings.

In one-package moisture-cured formulations, the coatings consist of solutions of the diisocyanate fraction which have been prepolymerized with as much of the polyol as possible without causing gelling. The final cure is derived from moisture adsorbed from the atmosphere after application.

Because the prepolymer usually is a viscous material, solvents are employed. This is a potentially dangerous formulation since any unreacted diisocyanate will escape with the evaporating solvent and many isocyanate exhibit serious toxicity properties.

In oil-modified formulations, in the usual one-package formulation, the diisocyanate is completely reacted with polyalcohol esters of drying oils.

The present invention employs a polyisocyanate which has been essentially completely blocked in admixture with hydroxystyrene homopolymers or copolymers in a suitable medium which is preferably water. Cationic electrocoatings may be prepared by dispersing the hydroxystyrene (co)polymer-blocked polyisocyanate mixture in water or water/co-solvent media. Water is preferably employed so that cationic electrocoatings may be prepared from a dispersion of the solids in water.

The films are thermoset, usually in the presence of a catalyst. It is hypothesized that the polyisocyanate is unblocked and then reacts with the active hydrogen members of the Mannich base to form a cohesive, cured film.

SUMMARY OF THE INVENTION

The invention provides a coating composition which comprises a uniformly dispersed admixture of
A. a fluid carrier; and
B. a homopolymer or copolymer containing monomer units of the formula

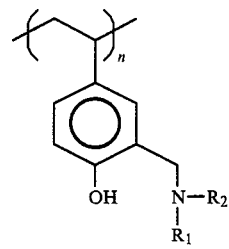

wherein $R_1$ and $R_2$ are independently $C_1$ to $C_{12}$ alkyl, or hydroxyalkyl, or aryl, wherein the comonomer is a substituted or unsubstituted component selected from the group consisting of styrene, acrylates, methacrylates and maleimides; said homopolymer or copolymer having an average molecular weight in the range of from about 360 to about 200,000; and
C. a polyisocyanate compound having terminal NCO units blocked with a blocking component, said blocking component selected to prevent unblocking from the NCO units prior to the application of conditions suitable to cause the reaction of NCO groups from said polyisocyanate compound with said homopolymer or copolymer.

DETAILED DESCRIPTION OF THE PREFERRED EMBODIMENT

In the preferred embodiment, one begins preparing polymers which are Mannich bases of poly(p-hydroxystyrene). These preferably have the formula

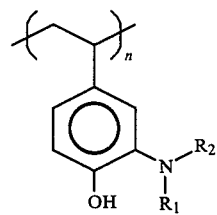

wherein $R_1$ and $R_2$ are $C_1$ to $C_{12}$ alkyl or hydroxyalkyl or aryl. Mannich bases of poly(p-hydroxystyrene) are per se well known in the art as described in U.S. Pat. Nos. 4,376,000; 4,433,015; 4,457,790 and 4,517,028 which are incorporated herein by reference. These compounds are based on derivatives of poly-alkenylphenol polymers. Examples of poly-alkenylphenols or substituted alkenylphenols useful in the present invention include isopropenylphenol, isobutenylphenol, dimethylvinylphenol and the like. Suitable derivatives having the above general formula may be made by the Mannich Reaction. For example, a poly-4-vinylphenol polymer can be reacted with formaldehyde and a secondary amine to yield a product which can be neutralized with an organic or inorganic acid to yield a water solution, dispersion or emulsion of the compound of this invention.

The molecular weight of the poly-alkenylphenol used in the preparation of derivatives claimed in the present invention can rang from low molecular weight oligomers of 360 to high molecular weight of 200,000 or greater.

The resulting derivatives of the formula set forth hereinabove will preferably have a molecular weight of 5,000 up to about 100,000, with molecular weights within the range of about 5,000 to about 30,000 being preferred.

The Mannich bases of this invention are soluble in organic solvents and can be used as a treatment solution when dissolved in an organic solvent as, for example, ethanol. Advantageously, however, the treatment compound can also be used out of an aqueous medium. To provide water solubility or water dispersibility of the compound, an organic or inorganic acid can be used for neutralization. For use in coatings, including electrocoatings, the preferred neutralizing acid should be a volatile acid that is released and evaporates during heat curing of the coating. Useful acids for this purpose are acetic acid, citric acid, oxalic acid, ascorbic acid, phenylphosphonic acid, chloromethylphosphonic acid; mono, di and trichloroacetic acid, formic acid, trifluoroacetic acid, nitric acid, phosphoric acid, hydrofluoric acid, sulfuric acid, boric acid, hydrochloric acid, hexafluorosilic acid, hexafluorotitanic acid, hexafluorozirconic acid, and the like; alone or in combination with each other. The addition of water to the neutralized, over neutralized or partially neutralized treatment compounds mentioned above results in a water solution, or dispersion or emulsion of the polymer.

In general about 15% to about 50% of the amine nitrogens are salted with the acid. Suitable secondary amines non-exclusively include dialkyl amines, dialkanol amines, alkylalkanol amines, and diallyl amines. Diethanol amine is most preferred. When a dialkanol amine is used, the hydroxyl groups on the amine moiety participate in the cure with blocked polyisocynate. The density of Mannich base units on the polymer may be varied by adjusting ratio of formaldehyde, amine, and polymer aromatic rings. The polymeric Mannich base is desirably recovered at 70-80% concentration in a water miscible glycol ether.

The polymer set forth above is preferably a homopolymer, but it may also be a copolymer wherein the comonomers are units of styrene, acrylates, methacrylates and maleimides. Both the phenolic and co-monomer units may optionally be substituted with a variety of pendant groups in order to adjust the properties of the compound as desired by the user.

The blocked isocyanates, or urethanes, useful for this invention are also well known in the art.

It is known that a polyurethane may be prepared by reacting a polyisocyanate, e.g., a diisocyanate, and a polyol, e.g., a diol. A polyurea may be prepared by reacting a polyisocyanate, e.g., a diisocyanate, and a polyamine, e.g., a diamine. A hybrid polymer, e.g., a polyurethane-polyurea, may be prepared by reacting a polyisocyanate, usually a diisocyanate, and a mixture of a polyamine and a polyol, or by first reacting the polyisocyanate with a stoichiometric deficiency of either the (a) polyamine or (b) polyol to form either a polyurea or polyurethane prepolymer respectively which is terminated with isocyanate groups and then reacting the prepolymer with whichever of (a) and (b) was not used to form the prepolymer in order to form the polyurethanepolyurea.

Illustrative of the polyisocyanates are the diisocyanates, e.g., the aromatic, aliphatic, and cycloaliphatic diisocyanates, and combinations thereof. More specifically illustrative of the diisocyanates are 2,4-tolylene diisocyanate, m-phenylene diisocyanate, xylylene diisocyanate, 4-chloro-2,3-phenylene diisocyanate, 4,4,-biphenylene diisocyanate, 1,4-tetramethylene and 1,6-hexamethylene diisocyanate, 1,4-dicyclohexyl diisocyanate, 1,5-tetrahydronaphthalene diisocyanate, methylene dicyclohexylene diisocyanate and the like. Diisocyanates in which each of the two isocyanate groups is directly attached to a ring are

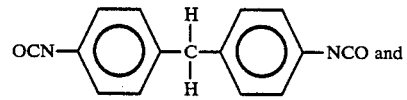

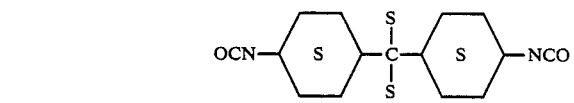

Other polyisocyanates which may be used non-exclusively include isophorone diisocyanate as well as polyaromatic polyisocyanates such as MRS-type from Mobay, and PAPI-type from Upjohn. Still other polyisocyanates, i.e. those having more than two isocyanate groups, may also be used. They may be prepared in different ways. For example, water may be used as an active hydrogen containing compound in the preparation of the polyisocyanate. Biuret polyisocyanates are thereby produced in accordance with the disclosure of U.S. Pat. No. 3,124,605, which describes a compound having not more than three -NCO groups and the formula:

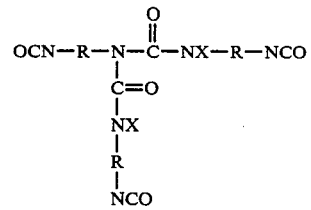

wherein X is selected from the group consisting of hydrogen and the grouping —CO—NX—R—NCO and R is the organic radical left after removal of the two —NCO groups from an organic diisocyanate selected from the group consisting of cyclohexane diisocyanate, hexamethylene diisocyanate, phenylene diisocyanate, lower alkyl substituted phenylene diisocyanate, lower alkoxy phenylene diisocyanate, diphenylmethane diisocyanate, dicyclohexyl diisocyanate and chloro-substituted phenylene diisocyanate, said hydrogen being the only one on the compound which is reactive with an —NCO group. The polyisocyanates can contain other substituents, although those which are free from reactive groups other than the isocyanate groups are preferred. Mixtures of polyisocyanates may also be used to prepare the unsaturated monomers used in this invention.

Illustrative of the polyols are the diols, triols, tetrols, etc. The diols are generally preferred.

More specifically illustrative of the monomeric diols are ethylene glycol; propylene glycol; 1,3-butylene glycol; 1,4-butane diol; 1,5-pentanediol, hexamethylene glycol, 1,3-bis (hydroxy ethyl)-5,5'-dimethyl hydantoin, etc. More specifically illustrative of the monomeric triols are 2-(hydroxymethyl)-2-methyl-1,3-propanediol, trimethylolpropane, glycerol, castor oil, etc. More specifically illustrative of the tetraols is pentaerythritol.

In the preferred embodiment a blocked polyisocyanate is formed by reaction of polyaromatic polyisocyanate with isocyanate functionality of 2.3 such as MRS-10 (Mobay Chem.) with an equivalent amount of a blocking agent such as MEK oxime, caprolactam, a phenol, etc. The blocked polyisocyanate is recovered at 70-80% concentration in water miscible solvent such as a glycol ether.

The Mannich base and blocked isocyanate solutions are then blended together in approximately a 0.5-2:1 preferably 1:1 equiv. ratio blocked NCO:phenolic hydroxyl. Water is then added under fairly high speed agitation to form an oil in water dispersion. In general at least about 20% of the active hydrogen groups of the Mannich base should be reacted with NCO groups in order to effect a cure. In the preferred embodiment from about 20% to about 100% should be so reacted. This dispersion may be used by coating it on a surface to be protected from corrosion, such as a metal surface. Well cured thermo-setting films on metal are produced on baking at 150°-200° C. for 10-30 min. in presence of, for example, an optional dibutylin dilaurate catalyst.

Cationic electrocoated films may also be produced from these dispersions. In addition to water-borne coatings as described above, solvent-borne coatings are also contemplated for coating applications other than electrocoating.

The following non-limiting example serves to illustrate the invention.

EXAMPLE

At room temperature a solution of the diethanolamine Mannich base of poly(p-hydroxystyrene) (6.0 g, 65% solids in propylene glycol monopropyl ether), and the methyl ethyl ketone oxime blocked polymethylene polyphenyl polyisocyanate (Mondur MRS-10 available from Mobay 10.0 g, 56.7% solids in propylene glycol monopropyl ether), are mixed together to give an opaque viscous mixture. Methanol (15 ml) is added with stirring to give a clear orange-brown solution. Films are drawn down on a phosphated steel panel, (1 mil wet thickness), and then baked at 175° C. for 30 minutes. Breakthrough is not observed after 100 methyl ethyl ketone double rubs, indicating excellent film cure.

What is claimed is:

1. A coating composition which comprises a uniformly dispersed admixture of
   A. a fluid carrier; and
   B. a homopolymer or copolymer containing monomer units of the formula

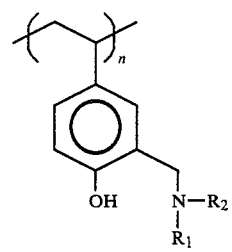

wherein $R_1$ and $R_2$ are independently $C_1$ to $C_{12}$ alkyl, or hydroxyalkyl, or aryl, wherein the comonomer is a substituted or unsubstituted component selected from the group consisting of styrene, acrylates, methacrylates and maleimides; said homopolymer or copolymer having a value of n which corresponds to an average molecular weight in the range of from about 360 to about 200,000; and
   C. a polyisocyanate compound having terminal NCO units blocked with a blocking component, said blocking component selected to prevent unblocking from the NCO units prior to the application of conditions suitable to cause the reaction of NCO groups from said polyisocyanate compound with said homopolymer or copolymer.

2. The composition of claim 1 wherein component (B) is a homopolymer having an average molecular weight in the range from about 5,000 to about 100,000.

3. The composition of claim 1 wherein component (B) is a homopolymer having an average molecular weight in the range from about 5,000 to about 30,000.

4. The composition of claim 1 wherein $R_1$ and $R_2$ are $C_2$ to $C_{12}$ alkyl or hydroxyalkyl.

5. The composition of claim 1 wherein $R_1$ and $R_2$ are independently selected from the group consisting of $-CH_2CH_2OH$ and $-CH_2CH_2CH_2OH$.

6. The composition of claim 1 wherein said fluid carrier comprises water or water in admixture with a water miscible glycol monoether.

7. The composition of claim 1 wherein said fluid carrier comprises an alcohol.

8. The composition of claim 1 wherein said fluid carrier comprises methanol or ethanol.

9. The composition of claim 1 wherein said polyisocyanate is a diisocyanate.

10. The composition of claim 9 wherein said diisocyanate is a poly(methylene diphenyl) polyisocyanate.

11. The composition of claim 9 wherein said blocking agent is methyl ethyl ketone oxime.

12. The composition of claim 10 wherein said blocking agent is methyl ethyl ketone oxime.

13. The composition of claim 1 wherein said blocking agent is caprolactam or a phenol.

14. The composition of claim 1 further comprising a catalyst capable of accelerating the reaction between components (B) and (C).

15. The composition of claim 14 wherein said catalyst is dibutyl tin dilaurate.

16. The composition of claim 15 wherein components (B) and (C) are present in about a 1:1 equivalent ratio of blocked NCO:phenol hydroxyl groups.

17. The composition of claim 1 wherein said fluid carrier comprises water or an alcohol; component (B) is a homopolymer wherein $R_1$ and $R_2$ are hydroxyalkyl and the homopolymer has an average molecular weight in the range of from about 5,000 to about 30,000; and said polyisocyanate is poly(diphenyl methane diisocyanate blocked with a blocking agent selected from the group consisting of methyl ethyl ketone oxime, caprolactam and a phenolic compound, and components (B) and (C) are present in about a 1:1 equivalent ratio of blocked NCO:phenolic hydroxyl groups.

18. The composition of claim 17 further comprising a catalytic amount of dibutyl tin dilaurate.

19. A method of protecting a surface which comprises applying the composition of claim 1 onto said surface and curing the composition by heating.

20. The method of claim 19 wherein said curing is conducted by baking the composition at from about 150° C. to about 200° C. for from about 10 to about 30 minutes in the presence of a catalyst.

21. A method of protecting a metallic surface which comprises cationically electrodepositing the composition of claim 1 onto said surface and curing the composition by heating wherein the fluid carrier is water or a water/co-solvent mixture.

* * * * *